US009560232B2

(12) United States Patent
Suzuki

(10) Patent No.: US 9,560,232 B2
(45) Date of Patent: Jan. 31, 2017

(54) IMAGE PROCESSING APPARATUS, METHOD OF CONTROLLING THE SAME, AND STORAGE MEDIUM FOR CONFIGURING A RECONFIGURABLE DEVICE

(71) Applicant: CANON KABUSHIKI KAISHA, Tokyo (JP)

(72) Inventor: Katsunari Suzuki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/828,993

(22) Filed: Aug. 18, 2015

(65) Prior Publication Data

US 2016/0057305 A1 Feb. 25, 2016

(30) Foreign Application Priority Data

Aug. 25, 2014 (JP) .................................. 2014-170898

(51) Int. Cl.
*H04N 1/00* (2006.01)
*G06T 1/20* (2006.01)

(52) U.S. Cl.
CPC ............ *H04N 1/00912* (2013.01); *G06T 1/20* (2013.01); *H04N 2201/0094* (2013.01)

(58) Field of Classification Search
None
See application file for complete search history.

(56) References Cited

U.S. PATENT DOCUMENTS

| 2010/0225948 | A1* | 9/2010 | Sato | H04N 1/00965 358/1.13 |
| 2010/0245878 | A1* | 9/2010 | Yamada | H04N 1/0096 358/1.13 |
| 2010/0271668 | A1* | 10/2010 | Hasui | H04N 1/00954 358/474 |
| 2012/0105884 | A1* | 5/2012 | Matsumura | G06F 9/445 358/1.13 |
| 2014/0244981 | A1* | 8/2014 | Okada | G06F 15/7867 712/220 |

(Continued)

FOREIGN PATENT DOCUMENTS

JP 2005-235074 A 9/2005
JP 2008219806 A * 9/2008

*Primary Examiner* — Thomas D Lee
(74) *Attorney, Agent, or Firm* — Carter, DeLuca, Farrell & Schmidt, LLP

(57) ABSTRACT

In an image processing apparatus including a reconfigurable device, a plurality of configuration data items for configuring a circuit for realizing a predetermined function in the reconfigurable device and for arranging and wiring the respective circuit at differing locations of the device to each other are stored in a memory, and operation information is obtained and accumulated based on an operation time of the circuit for realizing the predetermined function each time a job using the circuit for realizing the predetermined function is executed. Then, when the accumulated value exceeds a threshold, the circuit for realizing the predetermined function is configured in the reconfigurable device using other configuration data corresponding to the circuit for realizing the predetermined function and stored in the memory.

9 Claims, 14 Drawing Sheets

(56) References Cited

U.S. PATENT DOCUMENTS

| | | | |
|---|---|---|---|
| 2014/0351556 A1* | 11/2014 | Fawaz | G06F 15/80 |
| | | | 712/15 |
| 2015/0052344 A1* | 2/2015 | Matsumoto | H03K 19/017581 |
| | | | 713/100 |
| 2015/0256687 A1* | 9/2015 | Shinto | H04N 1/0083 |
| | | | 358/1.15 |
| 2015/0261478 A1* | 9/2015 | Obayashi | H04N 1/00896 |
| | | | 358/1.15 |
| 2015/0373225 A1* | 12/2015 | Tanaka | H04N 1/32609 |
| | | | 358/474 |

* cited by examiner

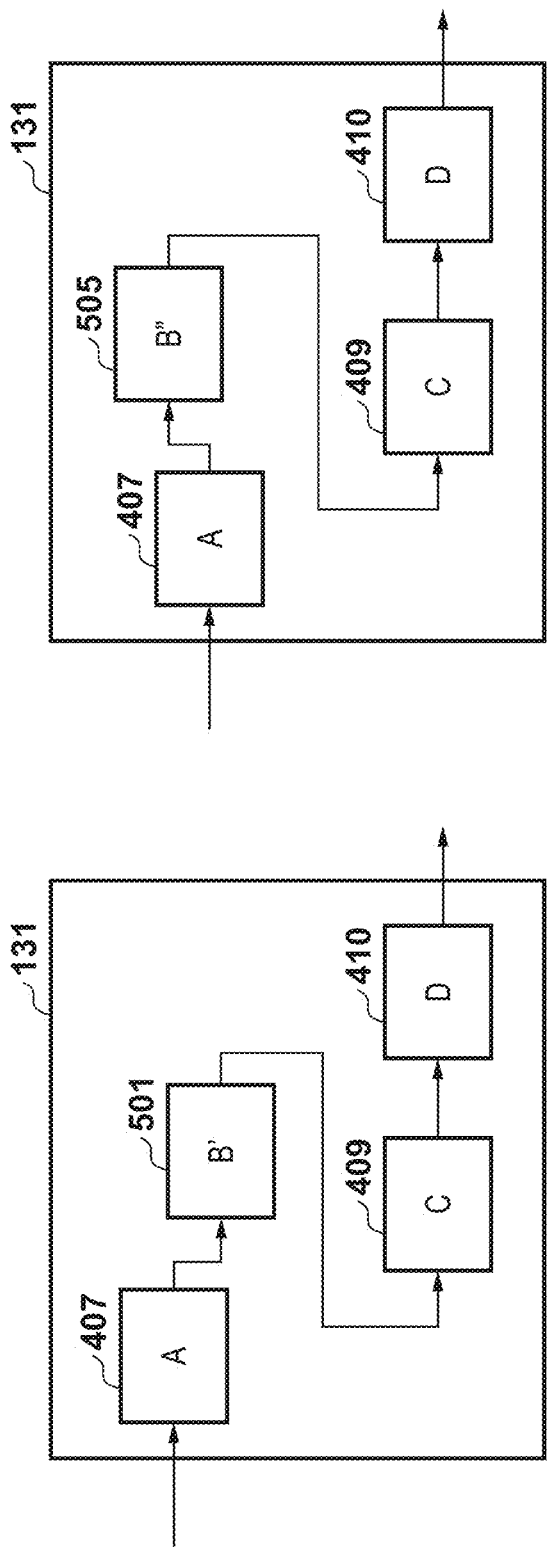

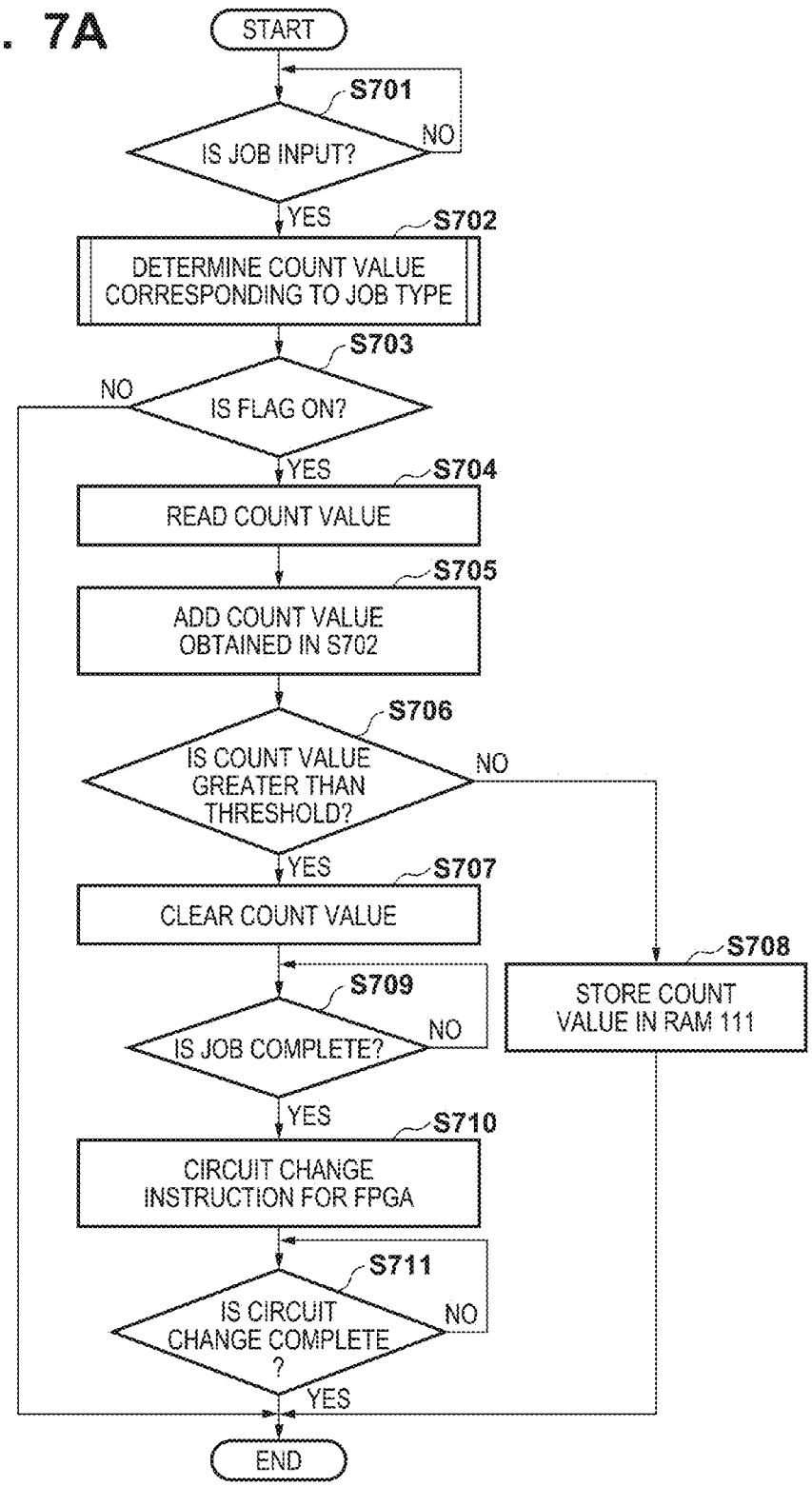
F I G. 7A

FIG. 10A
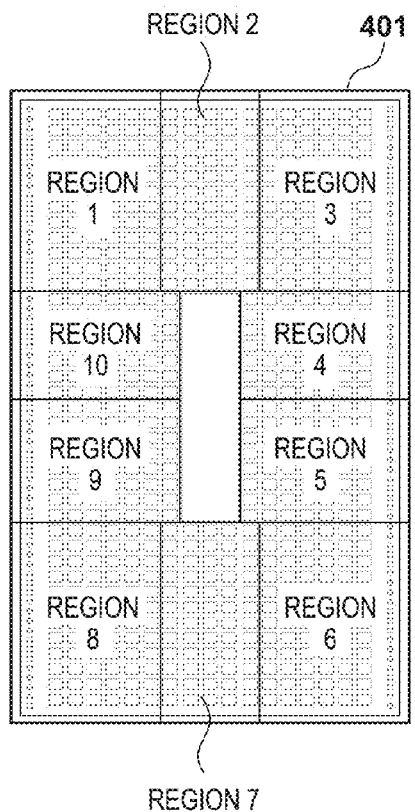
FIG. 10B
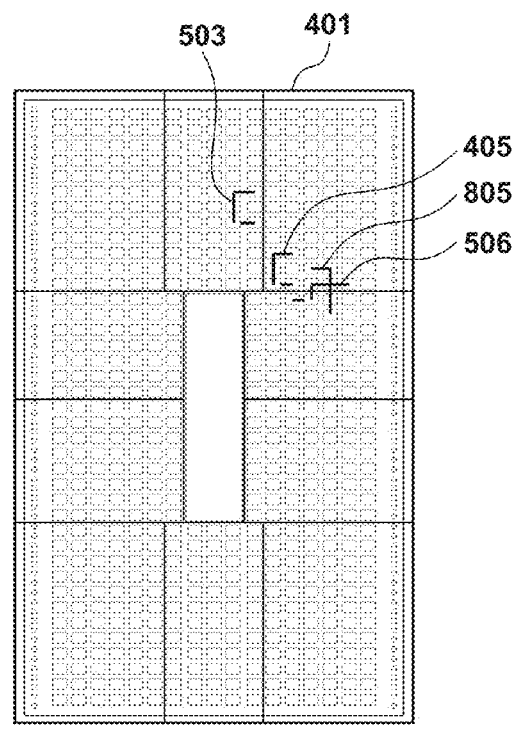
FIG. 10C
| | REGION | | | | | | | | | |
|---|---|---|---|---|---|---|---|---|---|---|
| BLOCK | 1 | 2 | 3 | 4 | 5 | 6 | 7 | 8 | 9 | 10 |
| B | | | O | | | | | | | |
| B' | | O | | | | | | | | |
| B" | | | O | O | | | | | | |
| F | | | O | O | | | | | | |
| | | | | | | | | | | |

IMAGE PROCESSING APPARATUS, METHOD OF CONTROLLING THE SAME, AND STORAGE MEDIUM FOR CONFIGURING A RECONFIGURABLE DEVICE

BACKGROUND OF THE INVENTION

Field of the Invention

The present invention relates to an image processing apparatus, a method of controlling the same, and a storage medium.

Description of the Related Art

Reconfigurable devices, such as a PLD (Programmable Logic Device) that is able to modify an internal the logical circuit configuration, or an FPGA (Field Programmable Gate Array), are well-known. Function modification for a PLD or an FPGA is realized by writing circuit configuration information that is stored in a non-volatile memory, such as a ROM, to an internal configuration memory, which is volatile memory, at an activation time, and thereby switching a function of an internal logical block. The circuit configuration information of the configuration memory is cleared at a time of a power supply disconnection for the apparatus, so it is necessary to perform reconfiguration by writing the circuit configuration information to the configuration memory once again at a time of a power supply activation. In this way, an approach of performing configuration of a hardware resource only once is called static reconfiguration.

In contrast, a circuit for which it is possible to change a logical circuit configuration while the circuit is operating has also been developed, and an approach of changing a logic circuit during operation is referred to as dynamic reconfiguration. There is also an FPGA for which it is possible to rewrite just a particular region rather than the entire chip, and this rewriting is called partial reconfiguration. With partial reconfiguration, partial reconfiguration of a logical block within an FPGA is realized by rewriting only a portion of a configuration memory, rather than by rewriting the entire configuration memory at a time of dynamic reconfiguration.

For example, Japanese Patent Laid-Open No. 2005-235074 discloses, as an example of reconfiguring during operation of an FPGA, a method of, when a software error or the like occurs after configuration of the FPGA, reconfiguring a corresponding circuit.

In such a semiconductor device, refinement of semiconductor process rules has been performed conventionally to improve a capability and to improve yields at a time of manufacture. Thereby, because it is possible to configure a large scale circuit with the same die size, it was advantageous from a point of cost-performance. In contrast, through refinement of the process rules of a semiconductor in this manner, the width of a wiring line for conveying a signal becomes thinner, so it is not possible to ignore effects of a phenomenon—in which a defect occurs in the form of a wiring line—called electromigration. A technique in which electromigration does not occur and that does not reduce the life span of a semiconductor device is also in demand for reconfigurable devices.

SUMMARY OF THE INVENTION

To solve the problem with the above described conventional techniques, the present invention provides a technique of suppressing the occurrence of electromigration in a reconfigurable device.

According to one aspect of the present invention, there is provided an image processing apparatus including a reconfigurable device, the image processing apparatus comprising: a first storage unit configured to store a plurality of configuration data items for configuring a circuit for realizing a predetermined function in the reconfigurable device, wherein each of the plurality of configuration data items is for arranging and wiring the circuit for realizing the predetermined function at a location in the device different to each other; an accumulating unit configured to obtain and accumulate operation information based on an operation time for the circuit for realizing the predetermined function, each time a job that uses the circuit for realizing the predetermined function is executed; and a reconfiguration unit configured to, when an accumulated value accumulated by the accumulating unit is greater than a threshold, control so as to configure the circuit for realizing the predetermined function in the reconfigurable device, by using, from the plurality of configuration data items corresponding to the circuit for realizing the predetermined function and stored in the first storage unit, another configuration data item other than a configuration data item that corresponds to the circuit configured in the reconfigurable device.

According to another aspect of the present invention, there is provided a method of controlling image processing apparatus including a reconfigurable device, the image processing apparatus comprising a memory configured to store a plurality of configuration data items for configuring a circuit for realizing a predetermined function in the reconfigurable device, wherein each of the plurality of configuration data items is for arranging and wiring the circuit for realizing the predetermined function at a location in the device different to each other, and the method comprising: obtaining and accumulating operation information based on an operation time for the circuit for realizing the predetermined function, each time a job that uses the circuit for realizing the predetermined function is executed; and controlling, when an accumulated value accumulated in the accumulating is greater than a threshold, so as to configure the circuit for realizing the predetermined function in the reconfigurable device, by using, from the plurality of configuration data items corresponding to the circuit for realizing the predetermined function and stored in the memory, another configuration data item besides a configuration data item that corresponds to the circuit configured in the reconfigurable device.

According to still another aspect of the present invention, there is provided a computer-readable storage medium storing a computer program for causing a computer to execute a method of controlling image processing apparatus including a reconfigurable device, the image processing apparatus comprising a memory configured to store a plurality of configuration data items for configuring a circuit for realizing a predetermined function in the reconfigurable device, wherein each of the plurality of configuration data items is for arranging and wiring the circuit for realizing the predetermined function at a location in the device different to each other, and the method comprising: obtaining and accumulating operation information based on an operation time for the circuit for realizing the predetermined function, each time a job that uses the circuit for realizing the predetermined function is executed; and controlling, when an accumulated value accumulated in the accumulating is greater than a threshold, so as to configure the circuit for realizing the predetermined function in the reconfigurable device, by using, from the plurality of configuration data items corresponding to the circuit for realizing the predetermined function and stored in the memory, another configuration data item besides a configuration data item that corresponds to the circuit configured in the reconfigurable device.

According to the present invention, it is possible to suppress occurrence of electromigration in a reconfigurable device.

Further features of the present invention will become apparent from the following description of exemplary embodiments (with reference to the attached drawings).

BRIEF DESCRIPTION OF THE DRAWINGS

FIG. 5A to FIG. 5F are views for showing examples of changing the location of block B from the arranging and wiring of FIG. 4A to FIG. 4D.

FIG. 7A and FIG. 7B are flowcharts for describing configuration processing for a reconfiguration unit of the FPGA in the image processing apparatus according to the first embodiment.

FIG. 10A to FIG. 10C are views for explaining an example of an internal cell structure of the FPGA in the image processing apparatus according to the second embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
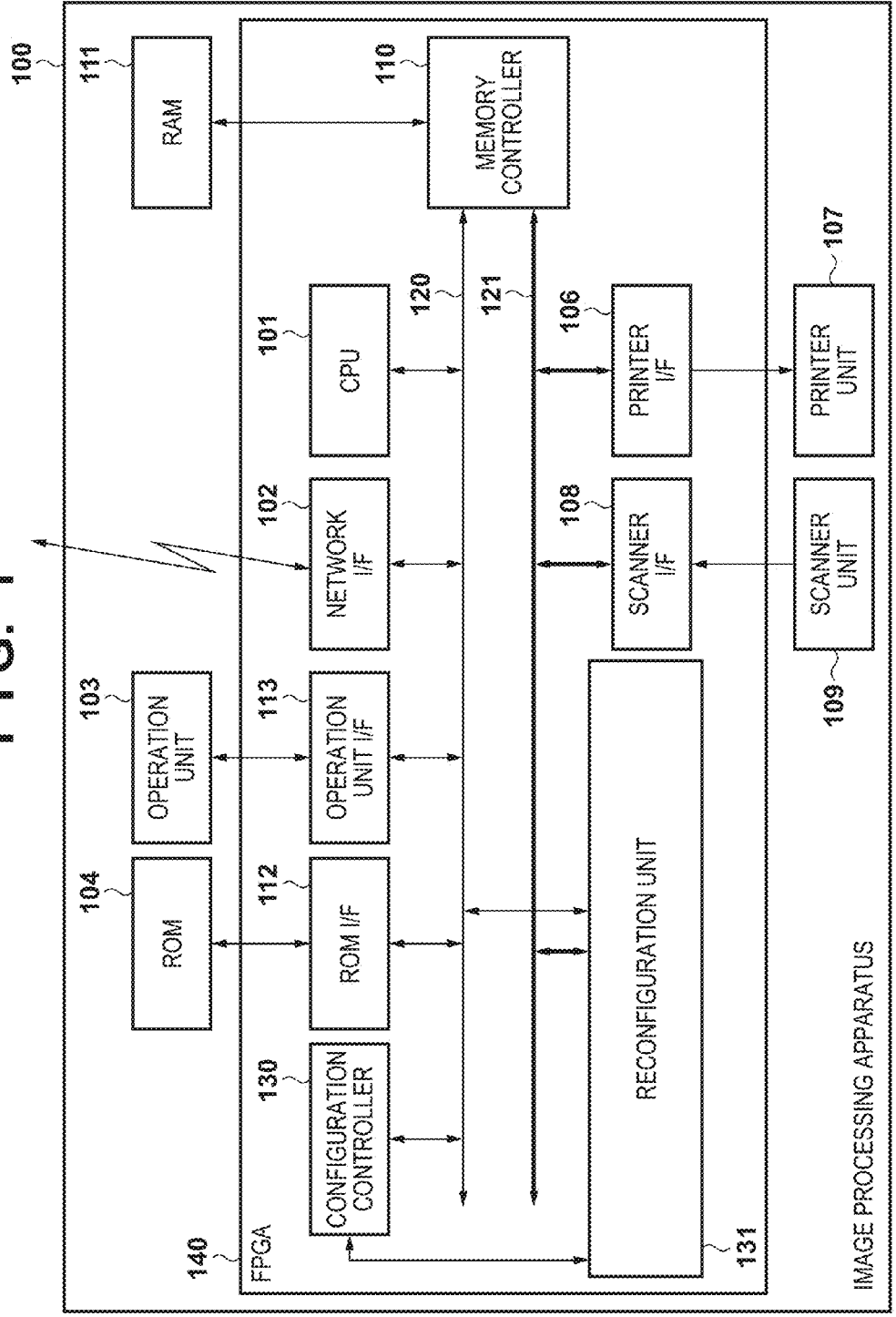
FIG. 1 is a block diagram for describing a configuration of an image processing apparatus according to a first embodiment of the present invention.

FIG. 1 is a block diagram for describing a configuration of an image processing apparatus 100 according to a first embodiment of the present invention.

The image processing apparatus 100 has an operation unit 103 for a user to perform various operations, settings or the like; a scanner unit 109 that reads an image of an original according to an instruction from the operation unit 103 and then outputs image data; and a printer unit 107 that prints the image data on a sheet. The scanner unit 109 has a CPU (not shown) for controlling the scanner unit 109, an illumination lamp for reading of an original, a scanning mirror, or the like (none of which are shown). The printer unit 107 has a CPU (not shown) for performing control of the printer unit 107, a photosensitive drum for performing image formation or fixation, a fixing device, or the like (none of which are shown).

As a controller that controls the image processing apparatus 100, the image processing apparatus 100 has an FPGA (Field Programmable Gate Array) 140, which is a reconfigurable device. In this example, the FPGA 140 includes a CPU 101 that comprehensively controls the operations of the image processing apparatus 100. The CPU 101 executes control software for controlling the FPGA 140 and units of the image processing apparatus 100, such as a configuration controller 130 which controls reconfiguration. Note that the FPGA 140 including the CPU 101 is merely one example, and the CPU 101 may be provided outside the FPGA 140. A ROM 104 stores a boot program that the CPU 101 executes and configuration data for configuration of a reconfiguration unit 131 of the FPGA 140. A RAM 111 provides a work memory for the CPU 101 to operate, and also provides an image memory to temporarily store image data, or the like.

The FPGA 140 includes the reconfiguration unit 131, and the configuration controller 130 for controlling reconfiguration via the reconfiguration unit 131. The reconfiguration unit 131 is a rewritable logic circuit, is dynamically rewritable, and is partially rewritable. In other words, while a circuit configured in a portion of the reconfiguration unit 131 is operating, it is possible to reconfigure a different portion of the reconfiguration unit 131 that does not overlap with the portion that the circuit occupies into a different circuit. The FPGA 140 also has a scanner I/F 108 that controls an interface with the scanner unit 109, and a printer I/F 106 that controls an interface with the printer unit 107. The reconfiguration unit 131, the scanner I/F 108, and the printer I/F 106 are connected to an image bus 121 for transferring image data that is processed.

The CPU 101 comprehensively controls operations of the image processing apparatus 100. A network I/F 102 performs communication (transmitting/receiving) with a general-purpose computer (not shown) via a network. A ROM I/F 112 controls reading of data from the ROM 104, which stores configuration data for configuration of the reconfiguration unit 131 and the boot program executed by the CPU 101. An operation unit I/F 113 controls an interface between the FPGA 140 and the operation unit 103. A memory controller 110 controls operations to write data to the RAM 111 and to read data from the RAM 111. The memory controller 110 is connected to a system bus 120 and the image bus 121, and exclusively switches between access to the RAM 111 from a bus master connected to the image bus 121 and access to the RAM 111 from a bus master connected to the system bus 120. The CPU 101, the network I/F 102, the operation unit I/F 113, the ROM I/F 112, the configuration controller 130, and the reconfiguration unit 131 are connected to each other through the system bus 120. The CPU 101 performs setting of parameters to the printer I/F 106, the scanner I/F 108, and each image processing unit configured within the reconfiguration unit 131 via the system bus 120.

Next, referring to FIG. 2A, FIG. 2B, and FIG. 3, explanation will be given for a relationship between configuration data and an example of an image processing function configured by the reconfiguration unit 131 according to the first embodiment.

The image processing apparatus 100 has a function (a copy function) in which the scanner unit 109 makes a copy by reading an original and the printer unit 107 prints the obtained image data. The image processing apparatus 100 also has a function (a PDL print function) of using the printer unit 107 to perform printing of print data received via the network I/F 102 from a printer driver implemented in an external PC or the like (not shown). The image processing apparatus 100 also has a SEND function for transmitting image data of an original obtained via the scanner unit 109 to an external PC or the like (not shown) via the network I/F 102. If the FPGA 140 provided in the image processing apparatus 100 is capable of dynamic reconfiguration, the image processing apparatus 100 performs processing to configure an image processing circuit to realize a necessary image processing function in the reconfiguration unit 131, in response to a function selected by the user and a changed setting item.

Figure 2A:
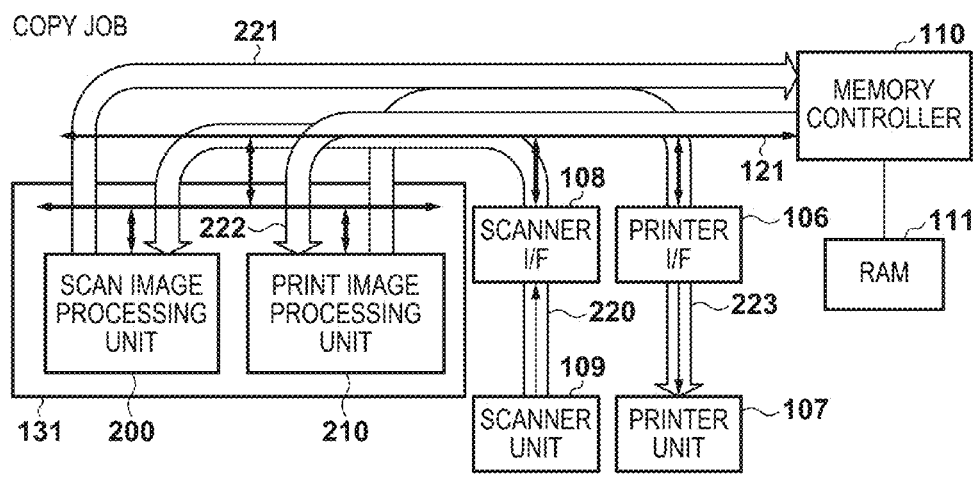
FIG. 2A is a block diagram for describing a flow of data and a functional configuration of a reconfiguration unit in a case of a copy job in the image processing apparatus according to the first embodiment.

FIG. 2A is a block diagram for describing a flow of data and a functional configuration of the reconfiguration unit 131 in the case of a copy job in the image processing apparatus 100 according to the first embodiment. Note that in FIG. 2A, portions in common with FIG. 1 are shown with the same reference numerals.

Firstly, image data of an original obtained through the scanner unit 109 is transferred via the scanner I/F 108 and the image bus 121 to a scan image processing unit 200 configured in the reconfiguration unit 131 The flow of this image data is called a transfer flow 220. The scan image processing unit 200 executes image processing, such as image region determination processing or an RGB direct mapping process, on the image data. The image data that is thus processed is next transferred to the memory controller 110 via the image bus 121, and stored in the RAM 111. The flow of this image data is called a transfer flow 221. Image data thus stored in the RAM 111 is read by the memory controller 110, and transferred via the image bus 121 to a printer image processing unit 210 configured in the reconfiguration unit 131. The flow of this image data is called a transfer flow 222. The printer image processing unit 210 executes copy halftoning processing, such as gamma correction processing or screen processing, on this image data. Image data for which thus image processing has been performed is transferred to the printer unit 107 via the image bus 121 and the printer I/F 106, and then printed. The flow of this image data is called a transfer flow 223.

As described above, image data is transferred in sequence of the transfer flow 220 to 223 for image data, and after predetermined image processing is executed in each image processing unit, the image is printed on a sheet, thus realizing the copy function.

Figure 2B:
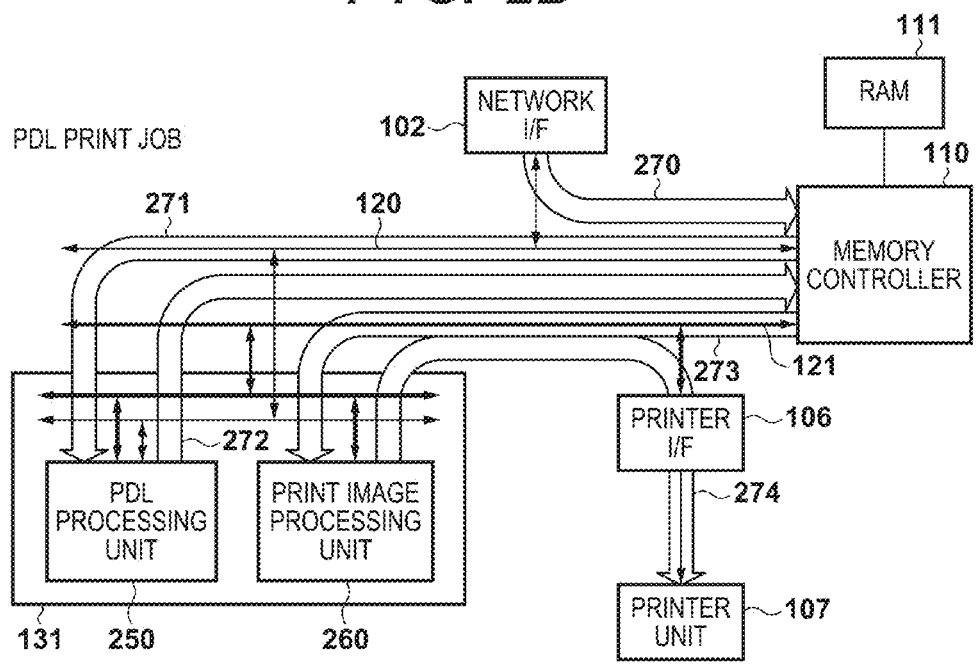
FIG. 2B is a block diagram for describing a flow of data and a functional configuration of a reconfiguration unit for a PDL print job in the image processing apparatus according to the first embodiment.

FIG. 2B is a block diagram for describing a flow of data and a functional configuration of the reconfiguration unit 131 for a PDL print job in the image processing apparatus 100 according to the first embodiment. Note that in FIG. 2B, a portion in common with FIG. 1 is shown with the same symbol.

Firstly, print data output from a PC or the like on a network (not shown) is transferred to the memory controller 110 via the network I/F 102 and the system bus 120, and then stored in the RAM 111. The flow of this image data is called a transfer flow 270. Next, print data stored in the RAM 111 is read by the memory controller 110, and transferred, via the system bus 120, to a PDL processing unit 250 configured by the reconfiguration unit 131. The flow of this image data is called a transfer flow 271. Based on the transferred print data, the PDL processing unit 250 generates intermediate language information through a processor or the like (not shown), and furthermore in parallel with this performs rasterization processing. This processing includes a process or the like of converting character encoding included in the print data to font data, such as an outline font or a bit pattern stored in advance. The print data according to this processing is converted into image data, and the converted image data is transferred to the memory controller 110 via the image bus 121, and stored in the RAM 111 again. The flow of this image data is called a transfer flow 272. Next, the image data stored in the RAM 111 is transferred, via the image bus 121, to a PDL job print image processing unit 260 configured by the reconfiguration unit 131. The flow of this image data is called a transfer flow 273. The PDL job print image processing unit 260 executes a PDL print process such as density correction processing or error diffusion processing on the image data. Image data thus image processed is transferred to the printer unit 107 via the image bus 121 and the printer I/F 106, and then printed. The flow of this image data is called a transfer flow 274.

As described above, the print data and the image data is transferred in the order of the image data transfer flow 270 to 274, is printed after a predetermined image process is executed in each image processing unit, to thus realize the PDL print function.

Figure 3:
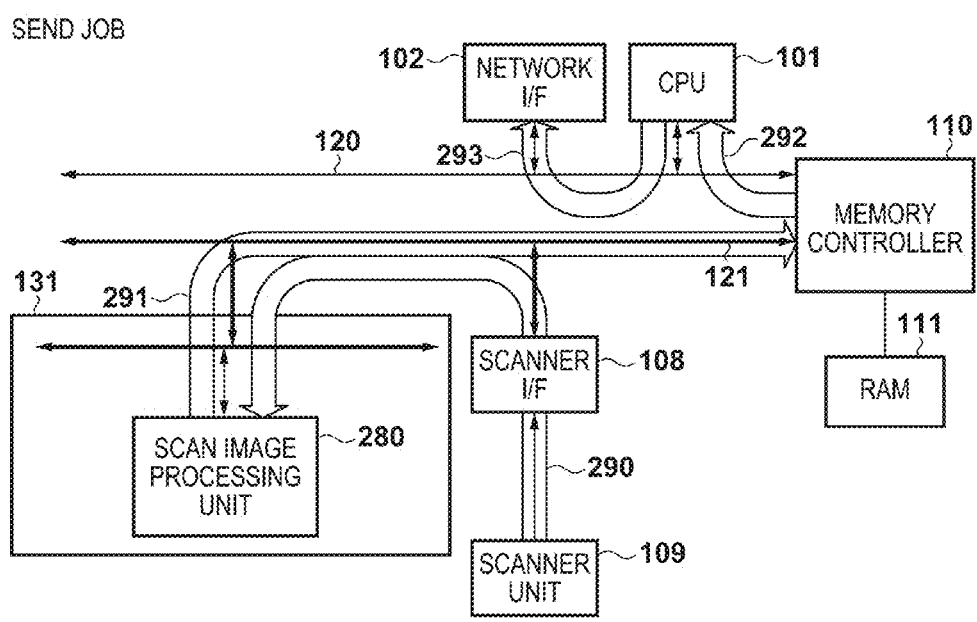
FIG. 3 is a block diagram for describing a flow of data and a functional configuration of a reconfiguration unit for a SEND function in the image processing apparatus according to the first embodiment.

FIG. 3 is a block diagram for describing a flow of data and a functional configuration of the reconfiguration unit 131 for a SEND function in the image processing apparatus 100 according to the first embodiment. Note that in FIG. 3, portion in common with FIG. 1 are shown with the same reference numerals.

Firstly, image data of an original obtained through the scanner unit 109 is transferred via the scanner I/F 108 and the image bus 121 to a scan image processing unit 280 configured in the reconfiguration unit 131. The flow of this image data is called a transfer flow 290. The scan image processing unit 280 executes resolution conversion processing or OCR image processing on the image data. The image data that is thus image processed is transferred to the memory controller 110 via the image bus 121, and stored in the RAM 111. The flow of this image data is called a transfer flow 291. The image data stored in the RAM 111 is converted to SEND image data after the CPU 101 executes OCU processing, high compression processing is performed on character region image data, and low compression processing such as JPEG compression is performed on non-character region image data. The flow of this image data is called a transfer flow 292. The converted image data is transferred to a PC on a network or the like (not shown) via the system bus 120 and the network I/F 102. The flow of this image data is called a transfer flow 293.

As described above, the image data for an original is transferred in an order of the image data transfer flow 290 to 294, and transferred to PC on a network or the like via the network after predetermined image processing is executed in each image processing unit to realize the SEND function.

Next, explanation will be given for configuration data used in configuration of a logic circuit within the reconfiguration unit 131 of the FPGA 140.

Configuration data is necessary to configure the logic circuit in the FPGA 140, and is circuit information for performing a desired operation. The configuration data is created by using an EDA (Electronic Design Automation) tool based on design information designed with a description language at a logical description level called RTL (Register Transfer Level). The EDA tool performs a design flow of reading-in design information at the RTL level or an IP (intellectual property) core design that can be used within an FPGA, logic synthesis, arranging and wiring, timing verification, gate level verification, or the like. And finally configuration data is created. By using the configuration data thus created to perform configuration of the FPGA 140, a desired logic circuit is configured in the FPGA 140.

Next, referring to FIG. 4A to FIG. 4D, explanation will be given for a circuit block specifying method for an arrange and wire flow in an EDA design flow according to the first embodiment.

Figure 4A:
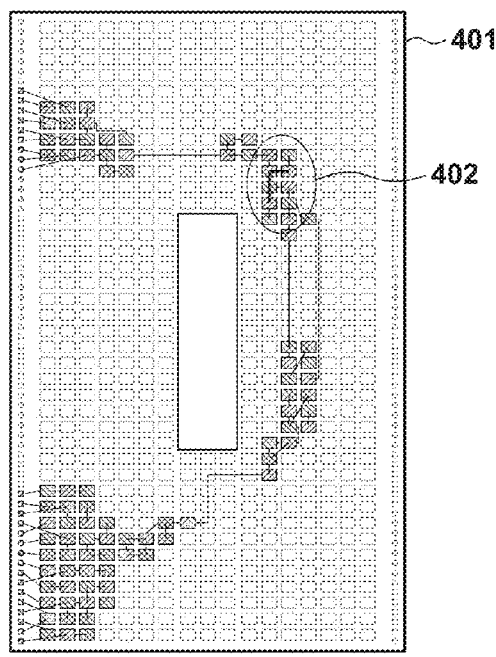
FIG. 4A to FIG. 4D are views for showing examples of an internal display of an FPGA in an arrange and wire flow in an EDA design flow according to the first embodiment.
Figure 4B:
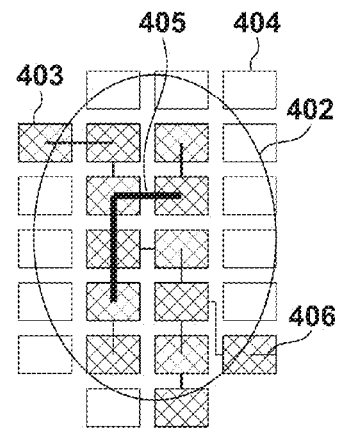

FIG. 4A is a view for showing an example of an internal display of an FPGA in an EDA tool in the above-described arrange and wire flow. Reference numeral 401 denotes an internal cell structure of the FPGA. An expanded view of a surrounded portion 402 within the FPGA internal display is shown in FIG. 4B. Note that other cells are omitted in the representation of FIG. 4A.

In FIG. 4B, reference numerals 403 and 404 indicate logic cells, and reference numeral 403 indicates a logic cell that is being used while reference numeral 404 indicates a logic cell that is not being used. Reference numeral 405 is a wiring line for connecting with logic cell 403, which is being used. At this point, the magnitude of an estimated amperage that flows through each wiring line is displayed on the EDA tool. In the first embodiment, it is estimated that thin wiring (406) has a small amperage, and thick wiring 405 has a large amperage.

Thereby, in the EDA tool, it is possible to estimate a target for an amperage of a wiring line within a logic circuit. It is possible to confirm which portion of the RTL a wiring line or logic cell from an arranged and wired net name, layer name, or the like corresponds to.

Figure 4C:
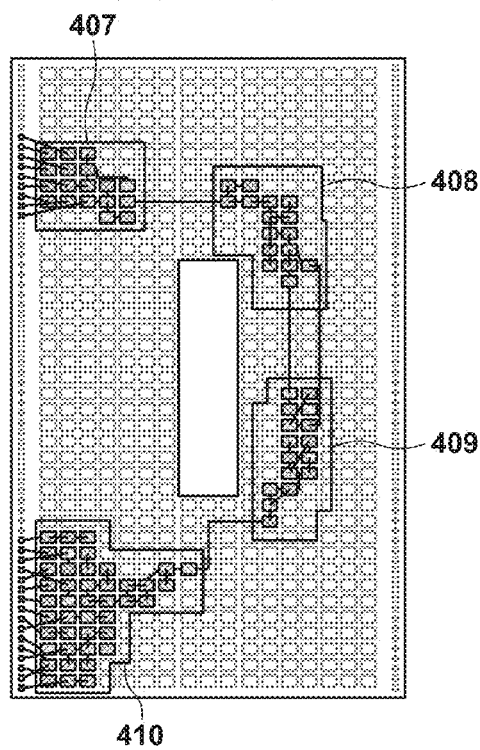

FIG. 4C displays how wiring lines and logic cells corresponding to FIG. 4A are shown as functional blocks in the RTL. FIG. 4C indicates four functional blocks—regions 407-410—and the regions of these functional blocks correspond to those of FIG. 4D. In other words, the reconfiguration unit 131 includes functional blocks A, B, C, D, and the region 407 corresponds to the functional block A, the region 408 corresponds to the functional block B, the region 409 corresponds to the functional block C, and the region 410 corresponds to the functional block D.

As described above, if the FPGA 140 is arranged and wired, it is possible to determine which portion of the internal wiring has a large amperage flowing through it, and which portion of a RTL functional block the wiring line is included in. With the example of FIG. 4A to FIG. 4D, it is seen from the logic circuits arranged and wired in the FPGA 140, a wiring line for which an amperage is estimated to become large exists in the functional block B.

It can be seen from the above described procedure that the amperage flowing through a wiring line inside the block B is greater than a predetermined size, and it is foreseen that such a wiring portion has a high probability of deteriorating due to the influence of electromigration. For example, if the above-described amperage is greater than that of a recommended operating condition in which the FPGA maker guarantees an operation, and is close to an upper limit for a range of tolerance for the operation, there is a possibility that the lifespan time of the FPGA will decrease. In such a case, it is necessary to arrange and wire the block B in a location different to the location shown in FIG. 4C.

For example, the wiring line 405 for which the amperage is large, as explained with FIG. 4B, is a known in advance net in RTL, so it is possible to perform setting so as to move this net information via the EDA tool to a location different to that in FIG. 4B. Thus a result of moving to a different location to FIG. 4B and arranging and wiring is FIG. 5A and FIG. 5C.

Figure 5A:
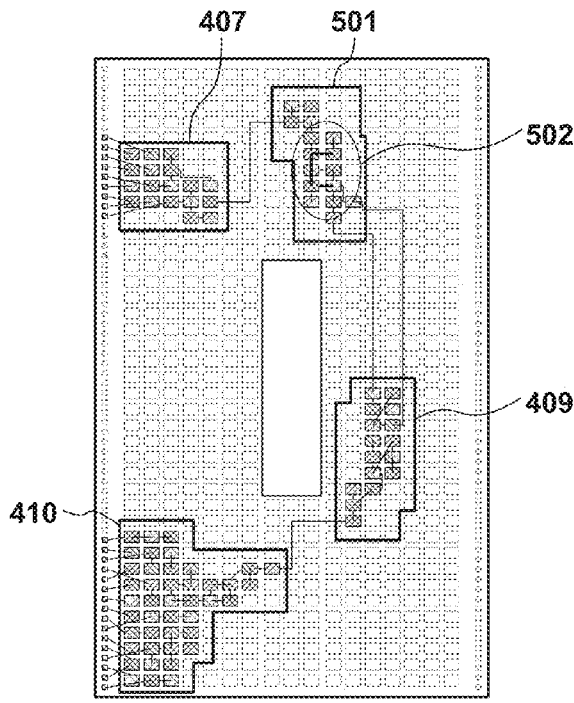
Figure 5B:
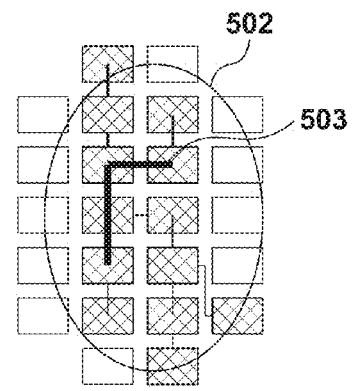

FIG. 5A shows an example in which the block B is arranged and wired in a location 501, which is a location moved in a top-left direction of the figure compared to the location of the region 408 in FIG. 4C. An expanded view of a surrounded portion 502 in FIG. 5A is shown in FIG. 5B. Here the wiring line 405 of FIG. 4B is arranged and wired as a wiring line 503 in FIG. 5B. Logic cells peripheral to the wiring lines are arranged and wired in locations as shown in FIG. 5A and FIG. 5B. At this point, a block diagram of internals of the reconfiguration unit 131 is represented with the block B replaced with a block B' 501 (same function), as shown in FIG. 5E.

Figure 5C:
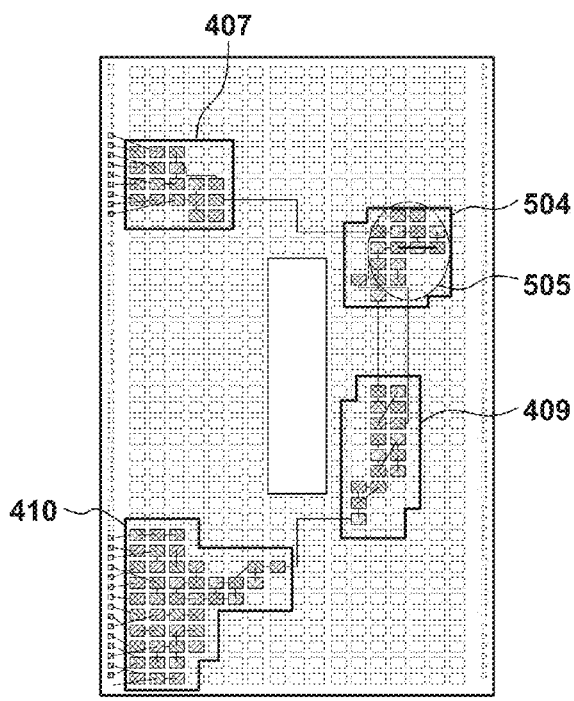
Figure 5D:
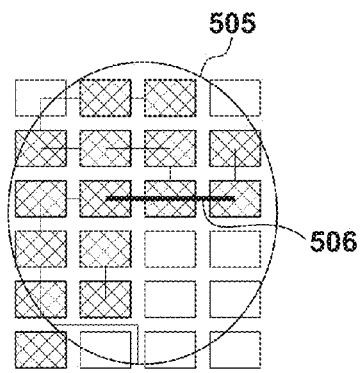

Similarly, FIG. 5C shows an example in which the block B is arranged and wired in a location 504, which is a location moved in a bottom-right direction of the figure compared to the location of the region 408 in FIG. 4C. An expanded view of a surrounded portion 505 in FIG. 5C is shown in FIG. 5D. Here the wiring line 405 of FIG. 4B is arranged and wired as a wiring line 506 in FIG. 5D. Logic cells peripheral to the wiring lines are arranged and wired in locations as shown in FIG. 5C and FIG. 5D. At this point, a block diagram of internals of the reconfiguration unit 131 is represented with the block B replaced with a block B" 504 (same function), as shown in FIG. 5F. Note that it goes without saying that there is no problem with timing verification after arranging and wiring.

In this way, the wiring line 405 for which the amperage is large of FIG. 4A to FIG. 4D is arranged and wired in a location of a different cell, as in each of the wiring line 503 in FIG. 5B or the wiring line 506 in FIG. 5D. Thus, by arranging and wiring the block B in a different location in the FPGA 140, it is possible to arrange and wire a wiring line, for which an amperage is large, in a location of a different cell.

As described above, a plurality of logic circuits are generated by arranging blocks, which include a wiring line for which an amperage is large, at locations different to each other in the FPGA 140.

Based on configuration information for each logic circuit thus obtained, configuration data for configuration within the FPGA is created by the EDA tool. Thereby, it is possible to generate a plurality of items of configuration data for configuration of logic circuits in which blocks that include a wiring line for which an amperage is large are arranged at locations respectively different to each other. Note that in the first embodiment, in order to simplify the explanation, three pieces of configuration data for the block B are generated and used.

The configuration data generated as described above is stored in the ROM 104. When an FPGA rewrite request is communicated from the CPU 101 to the configuration controller 130, the configuration controller 130 reads the configuration data from the ROM 104 and reconfigures the reconfiguration unit 131.

Figure 6:
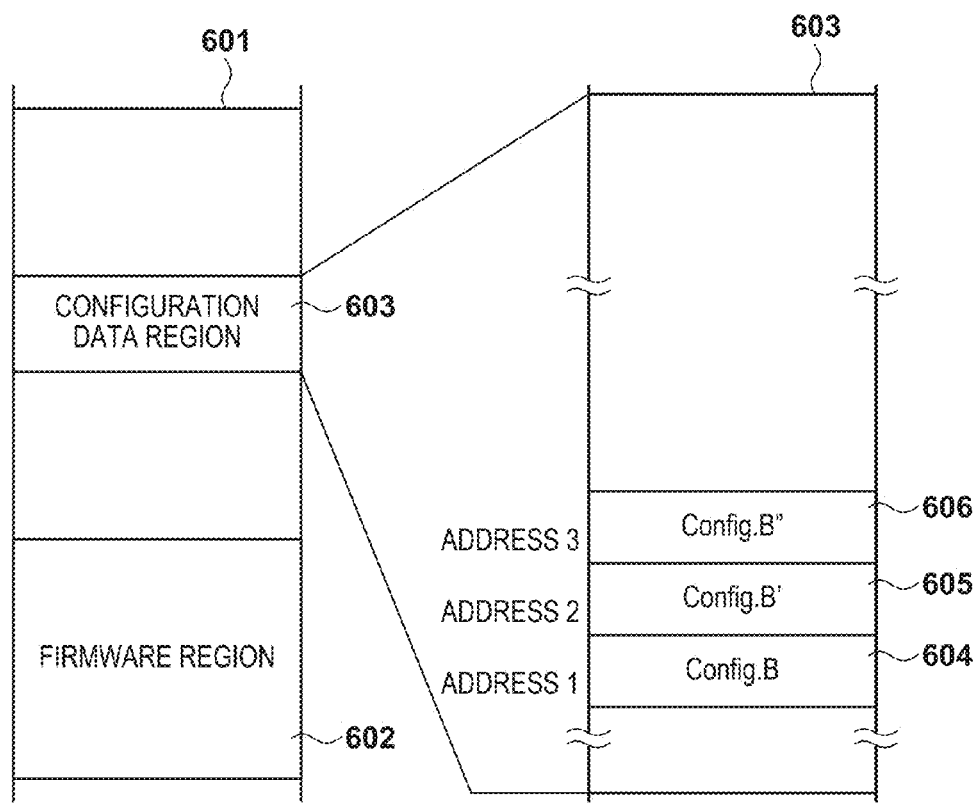
FIG. 6 is a view for explaining a memory map of a ROM of the image processing apparatus according to the first embodiment.

FIG. 6 is a view for explaining a memory map of the ROM 104 of the image processing apparatus 100 according to the first embodiment.

A memory space 601 represents the entire memory space of the ROM 104. A firmware region 602 stores firmware used by the CPU 101 to control operation of the image processing apparatus 100. A configuration data region 603 stores configuration data for rewriting the reconfiguration unit 131 in the FPGA 140.

The right side of FIG. 6 magnifies and indicates the configuration data region 603, and a configuration data region 604 stores configuration data for configuring the logic circuit of FIG. 4C. Suppose that the top address of the configuration data region 604 is an address 1. If the configuration data of the configuration data region 604 is used to rewrite the reconfiguration unit 131 in the FPGA 140, reconfiguration is performed with the logic circuit indicated in FIG. 4C.

A configuration data region 605 stores configuration data for configuring the logic circuit of FIG. 5A. Suppose that the top address of the configuration data region 605 is an address 1. If the configuration data of the configuration data region 605 is used to rewrite the reconfiguration unit 131 in the FPGA 140, reconfiguration is performed with the logic circuit indicated in FIG. 5A.

A configuration data region 606 stores configuration data for configuring the logic circuit of FIG. 5C. Suppose that the top address of the configuration data region 606 is an address 1. If the configuration data of the configuration data region 606 is used to rewrite the reconfiguration unit 131 in the FPGA 140, reconfiguration is performed with the logic circuit indicated in FIG. 5C. Regions empty in the configuration data region 603 store configuration data for configuring other logic circuits not explained here, and are not explained as they are not involved in the present embodiment. Accordingly, the CPU 101 stores which piece of configuration data corresponding to the logic circuit currently configured by the reconfiguration unit 131, for example, through the top address.

Figure 7B:
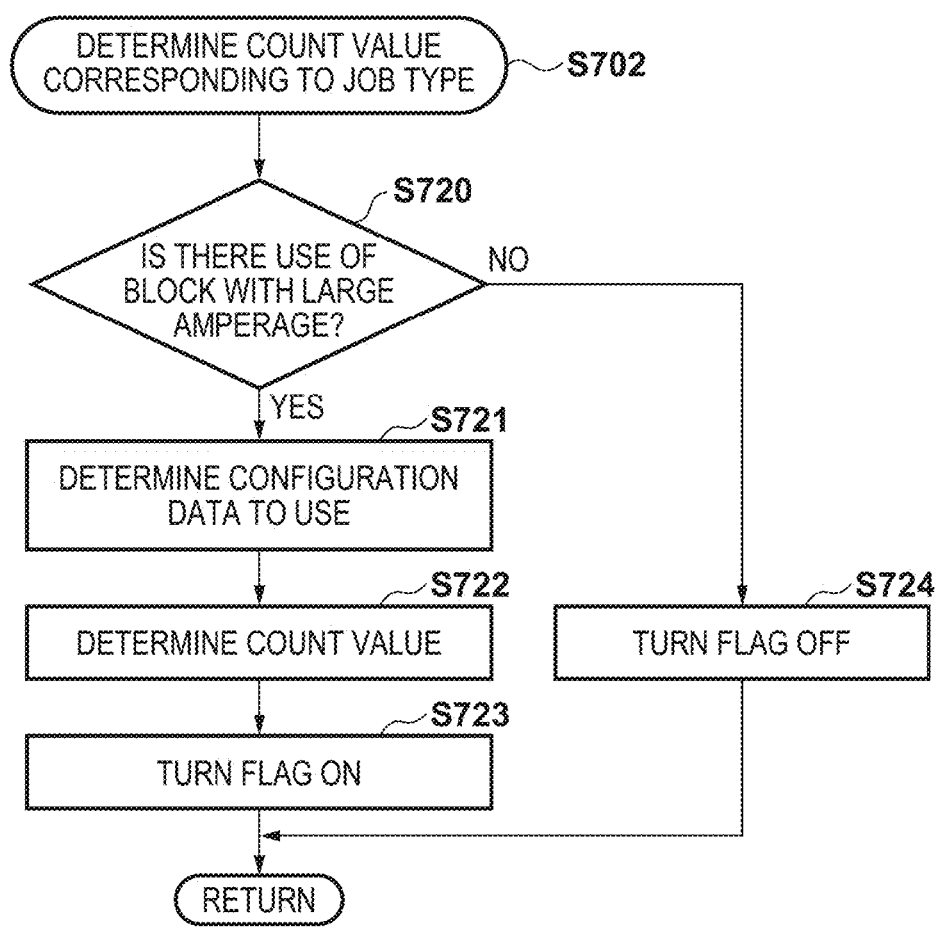

Next, with reference to FIG. 7A and FIG. 7B, a flowchart illustrating processing by the image processing apparatus 100 according to the first embodiment is illustrated. Note that in the first embodiment, particularly to the extent that there is no explanation, control is by the CPU 101, and information that should be stored during control is stored appropriately in a storage means, which is any of the RAM 111 or the ROM 104.

FIG. 7A is a flowchart illustrating configuration processing for the reconfiguration unit 131 of the FPGA 140 in the image processing apparatus 100 according to the first embodiment. Note that this processing is realized by the CPU 101 executing a program stored in the ROM 104.

Firstly, in step S701 the CPU 101, for example, determines whether a job is input from the operation unit 103, and advances, when a job has been input, processing to step S702, in which the CPU 101 identifies which block the input job is to use.

FIG. 7B is a flowchart illustrating the processing to identify which block the job in step S702 of FIG. 7A is to use.

In step S720 the CPU 101 determines whether the input job is to use a block in which an amperage is greater than a predetermined value, that is, the block B 408. For example, if the block B 408 is the logic circuit of the copy job print image processing unit 210 in FIG. 2A, it is determined that a block that includes a wiring line for which an amperage is large exists when a copy job is input. Meanwhile, when a PDL print job is input, it is determined that a block that includes a wiring line for which an amperage is large does not exist, and the processing proceeds to step S724, in which a flag is set to off so as to indicate that a block that includes a wiring line for which an amperage is large does not exist, and then the processing terminates. In step S720, when the CPU 101 determines that a block that includes a wiring line in which an amperage is large exists, the processing proceeds to step S721, in which the CPU 101 determines the configuration data to be used.

Figure 4D:
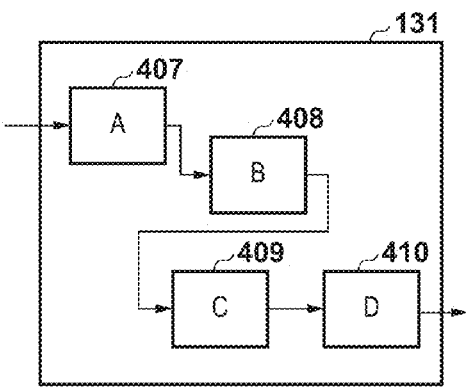

For example, as configuration data for a copy job, in previously described examples configuration data configuring FIG. 4D, FIG. 5E, and FIG. 5F exists. Here, information for configuration data previously used is stored in the RAM 111. Accordingly, configuration data to be used is determined from the stored information. Next the processing proceeds to step S722, and the CPU 101 analyzes a parameter, for example a sheet size, a positioned number, layout information, a double-sided print setting, or the like, set for the input job, and based on this determines a count value corresponding to an operation time. For example, if the input job is for ten sheets of originals and there is a 2-in-1 layout setting to reduce a two-page portion to then print onto one sheet, the number of sheets to print is five. In addition, if the printing speed of the printer unit 107 is 60 sheets/minute, the operation time becomes five seconds, so a count value (operation information) corresponding to this operation time (five seconds) is determined, and the processing proceeds to step S723. In step S723, the CPU 101 sets the flag on so as to indicate that a block that includes a wiring line in which an amperage is large exists, and this processing terminates. Note that above-described flag is provided in the RAM 111.

Next, the processing proceeds to step S703, and the CPU 101 determines whether a block that includes a wiring line for which an amperage is large exists through the result of the process of step S702—that is whether the flag is on. If it is determined here that the flag is on, the processing proceeds to step S704; otherwise processing terminates. In step S704 the CPU 101 reads the count value that indicates the operation time stored in the RAM 111. Note that the count value that indicates this operation time is incremented (accumulated) for each job, and the accumulated value is stored in the RAM 111 each time, so the current count value is read here. The processing proceeds to step S705, and the CPU 101 adds the read count value to the count value determined in step S702.

Next the processing proceeds to step S706, and the CPU 101 determines whether the count value obtained after the adding in step S705 is greater than a predetermined threshold. For example, in a case where the predetermined threshold is ten hours, when the count value obtained in step S705 is greater than ten hours, it means that the block B operated for longer than ten hours in total. In such a case, the processing transitions to step S707, and as the count value has surpassed the threshold, the count value is cleared and subsequently stored in the RAM 111. Next the processing proceeds to step S709, and the CPU 101 determines whether the job has completed. Here, if it is determined that the job has completed the processing proceeds to step S710, in which the CPU 101 outputs a circuit change instruction to the configuration controller 130.

The circuit change instruction includes information for the following configuration data. For example, if the configuration data currently used is stored in the region 604 of FIG. 6, a circuit change instruction according to the configuration data stored in the region 605 of FIG. 6 is output to the configuration controller 130. Thereby, while in the job executed previously, image processing was performed in the logic circuit of FIG. 4C, in the next job image processing is performed in the logic circuit of FIG. 5A. Next the processing proceeds to step S711, and the CPU 101 determines whether the rewrite operation for the logic circuit of the reconfiguration unit 131 of the FPGA 140 has completed. Here, when the configuration controller 130 completes rewriting the logic circuit, a completion notification is transmitted to the CPU 101, so when the completion notification is communicated to the CPU 101, it is determined that the rewrite operation has completed, and the processing terminates.

Note that in step S706 if the CPU 101 determines that the count value is less than or equal to the threshold, the processing proceeds to step S708, in which the CPU 101 stores the current count value in the RAM 111, and the processing terminates.

As explained above, by the first embodiment, when using a block for which there is the possibility that deterioration of the life span occurs, it is possible to reduce the effects due to electromigration by configuring the block at a different location in the FPGA each predetermined interval. Thus it is possible to extend the life span of the FPGA.

Note that in the first embodiment, three pieces of configuration data, such as for arranging and wiring the block B at a different location in the FPGA, are prepared, and these are switched in order upon each predetermined interval. Thus, compared to a case in which such a counter-measure is not implemented, it is possible to forecast a life span of approximately three times.

In addition, in the first embodiment three types of configuration data were prepared for one block. The present invention is not limited to this. There are restrictions due to a capacity of the ROM 104 or a configuration or the like of the logic circuit shown on FIG. 4A, but a configuration may be taken so as to prepare more than this number of pieces of configuration data and then switch between them. In addition, it is possible to achieve a desired life span by preparing a type of configuration data corresponding to the product lifespan.

Note that in the first embodiment, in order to simplify the explanation, the explanation was given for a configuration such that an entire block is switched in order, as shown in FIG. 4D, FIG. 5E, and FIG. 5F, in response to the circuit change instruction from the CPU 101. However, a configuration capable of partial rewriting, such as rewriting each logic circuit of the block B 408, the block B' 501 and the block B" 504, so as to change only the block B, may also be taken.

In the first embodiment, as a condition to output the circuit change instruction from the CPU 101, explanation was given of a case in which the operation time of the logic circuit is counted, and the count value surpasses a predetermined threshold. However, a configuration of simply outputting the circuit change instruction on the timing of turning power for the image processing apparatus 100 off/on may be used.

Note that in the first embodiment, explanation was given of configuring so as to use the RAM 111 to store the count value for the operation time of the logic circuit. However, it goes without saying that it is necessary to configure so that when a power supply is turned off, the count value is temporarily evacuated to the ROM 104 or another non-volatile memory, and the count value is not deleted by turning the power off.

Second Embodiment

Next, explanation will be given for a second embodiment of the present invention. In the second embodiment, in regards to the rewrite control of the logic circuit block explained in the above described first embodiment, explanation will be given for a management method for the operation time of the logic circuit when there exists a plurality of logic circuit blocks for which there is a necessity to perform rewriting. Note that the hardware configuration and the like of the image processing apparatus 100 according to the second embodiment is the same as the previously described first embodiment, so explanation thereof is omitted.

Figure 8A:
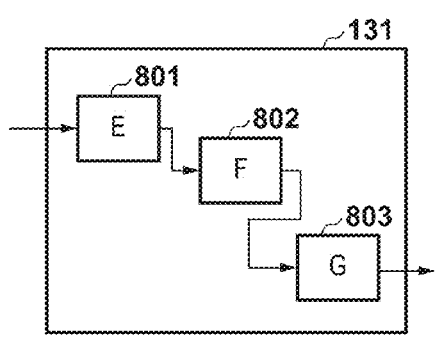
FIG. 8A to FIG. 8C are views for showing an example of a scan image processing unit used in a SEND job of an FPGA of the image processing apparatus according to a second embodiment of the present invention.
Figure 8B:
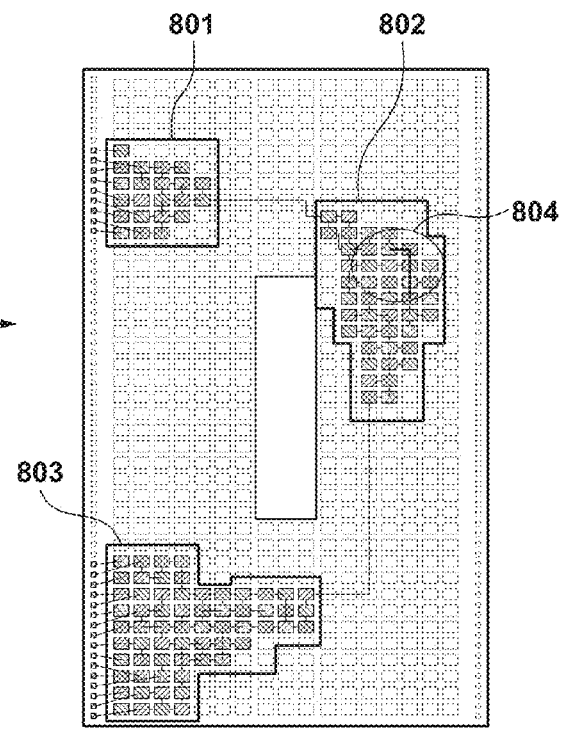
Figure 8C:
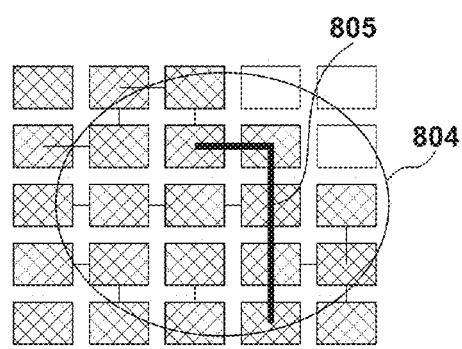

Shown in FIG. 8A to FIG. 8C is a logic circuit different to the logic circuit explained with FIG. 4D or the like, and, for example as explained with FIG. 3, the logic circuit in FIG. 8A-FIG. 8C is a logic circuit in a scan image processing unit used in a SEND job.

FIG. 8A shows a block diagram of the logic circuit of the scan image processing unit 280, and, for example, is configured by functional blocks 801-803, which are block E, block F and block G respectively. FIG. 8B shows an example of an internal display of an FPGA through an EDA tool when these logical blocks are arranged and wired in the FPGA 140. Shown are internal cells for an FPGA in which each block is arranged and wired as in the figure. An expanded view of a surrounded portion 804 in FIG. 8B is shown in FIG. 8C. From FIG. 8C it can be seen that the amperage flowing through a thick wiring line 805 is estimated to be large, and thereby in a block F 802 there exists a wiring line for which the amperage flowing through is estimated to be large. The configuration data to configure FIG. 8B is generated by the EDA tool.

Figure 9B:
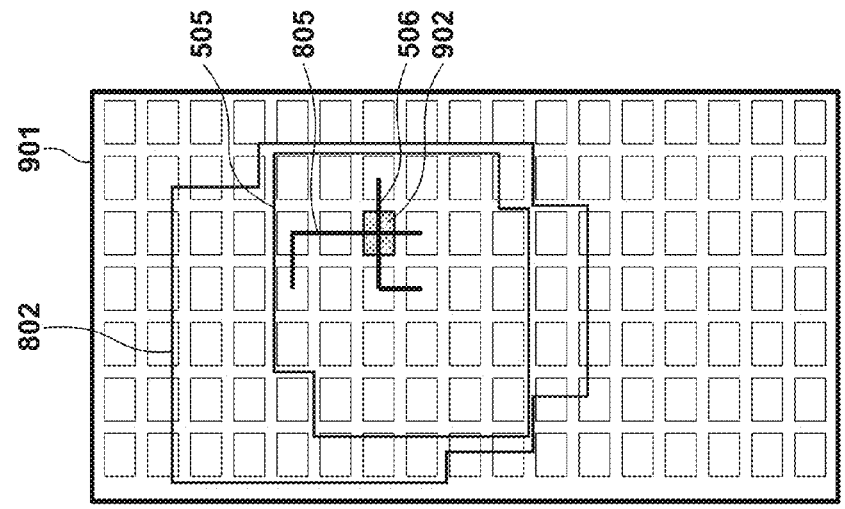
FIG. 9A and FIG. 9B are views for explaining an example of a logic cell configuration in an FPGA when a copy job and a SEND job are each executed in the second embodiment.
Figure 9A:
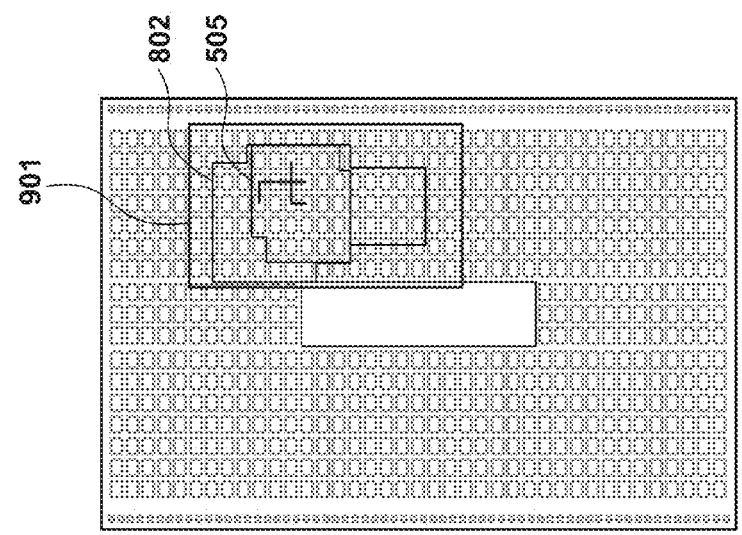

FIG. 9A and FIG. 9B are views for explaining an example of a logic cell configuration in an FPGA when a copy job and a SEND job are each executed in the second embodiment.

FIG. 9A shows a positional relationship in a case where the block B" 504 of FIG. 5F used at a time of execution of a copy job and the block F 802 of FIG. 8B used at a time of execution of a SEND job are both configured in the reconfiguration unit 131. It can be seen that the logic cell region of the block B" 504 and the logic cell region of the block F 802 are configured by being overlapped. An expanded view of a rectangular region 901 in the figure is shown in FIG. 9B. Note that to simplify the explanation, no distinguishing is made between cells that are used and cells that are not used.

Here, the wiring line 506 for which the amperage is large in the logic cell region of the block B" 504 and the wiring line 805 for which an amperage is large in the logic cell region of the block F 802 share the same cell 902. Accordingly, at a time of execution of a copy job or at a time of execution of a SEND job, a large amperage flows through the cell 902. In such a case, unless a total operation time for both a copy job and a SEND job is counted together, it is not possible to correctly count the operation time for the cell.

Accordingly, an operation time count approach as shown in FIG. 10A to FIG. 10C is used.

FIG. 10A to FIG. 10C are views for explaining an example of an internal cell structure 401 of the FPGA 140 in the image processing apparatus 100 according to the second embodiment.

FIG. 10A shows a state in which the internal cell structure 401 of the FPGA 140 is divided into ten regions, a region 1 to a region 10. Next, FIG. 10B plots wiring lines for which an amperage is large in the block B, the block B', the block B" and the block F, which are blocks for which an amperage is large, in the FPGA internal cell structure 401. The location of each wiring line is indicated in advance as explained in the first embodiment, so it is possible to plot as in this figure. From this figure, FIG. 10C indicates in a table, for each block, regions occupied by a wiring line for which an amperage is large. In FIG. 10B and FIG. 10C, the wiring line 405 having a large amperage in the block B is arranged in the region 3, the wiring line 503 having a large amperage in the block B' is arranged in the region 2, and the wiring line 506 having a large amperage in the block B" is arranged in the region 3 and the region 4. Furthermore, the wiring line 805 having a large amperage in the block F is arranged in the region 3 and the region 4.

Figure 11:
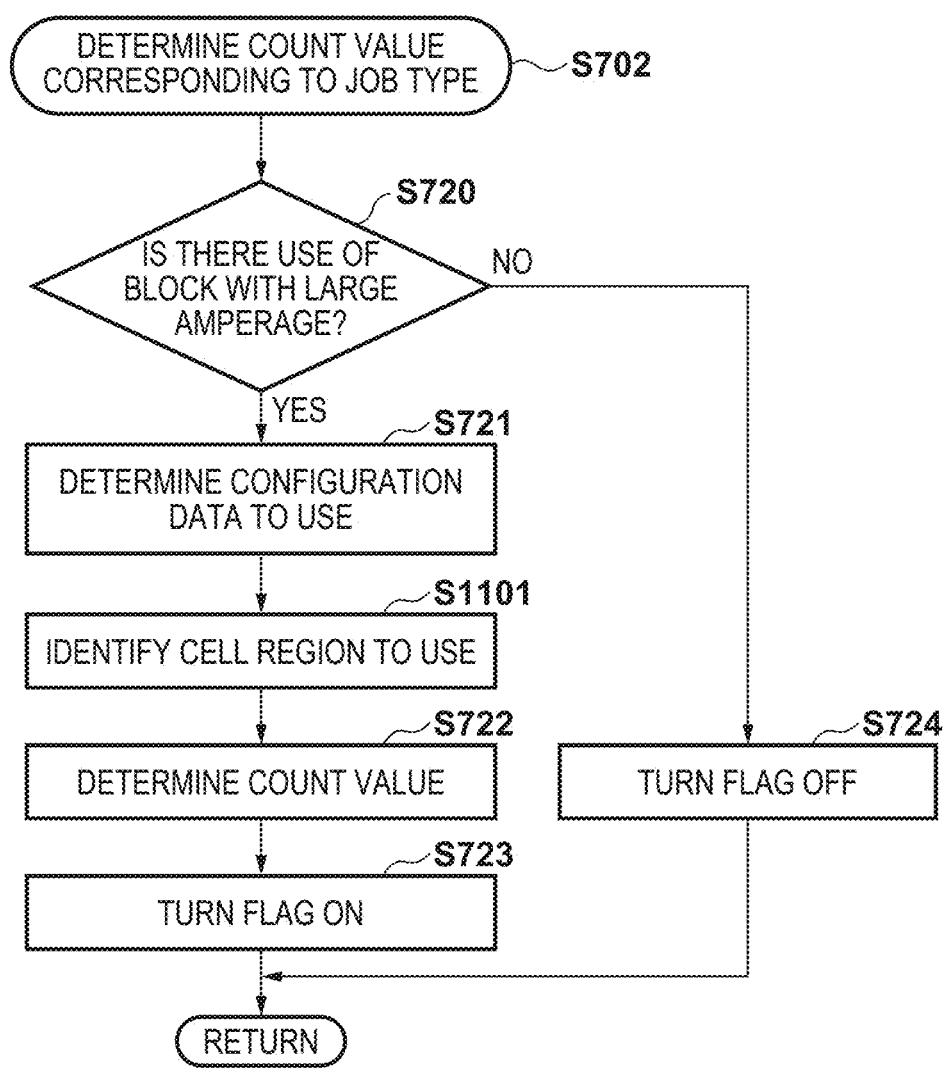
FIG. 11 is a flowchart illustrating processing that the image processing apparatus according to the second embodiment executes in step S702 of FIG. 7A.

Next referencing FIG. 11, shown is a flowchart for controlling operations performed in the second embodiment.

FIG. 11 is a flowchart illustrating processing that the image processing apparatus 100 according to the second embodiment executes in step S702 of FIG. 7A. Other control flows are the same as the previously described first embodiment, so in the second embodiment explanation thereof is omitted.

Firstly in step S720, the CPU 101 determines whether an input job is a job that requires a block in which an amperage is large. For example, if the input job is a copy job, the block B for which amperage is large is required. For example, if the input job is a SEND job, the block F for which amperage is large is required. In step S720, if the CPU 101 determines that a block that includes a wiring line for which an amperage is large exists the processing proceeds to step S721, otherwise the processing terminates.

In step S721 the CPU 101 determines the configuration data to be used. As configuration data for the copy job, there exists configuration data for configuring the logic circuits of FIG. 4D, FIG. 5E, and FIG. 5F. As configuration data for a SEND job, there exists configuration data for configuring the logic circuit of FIG. 8A. These pieces of configuration data are stored in a configuration data region 603 in the memory space 601 of the ROM 104 as shown in FIG. 12.

Figure 12:
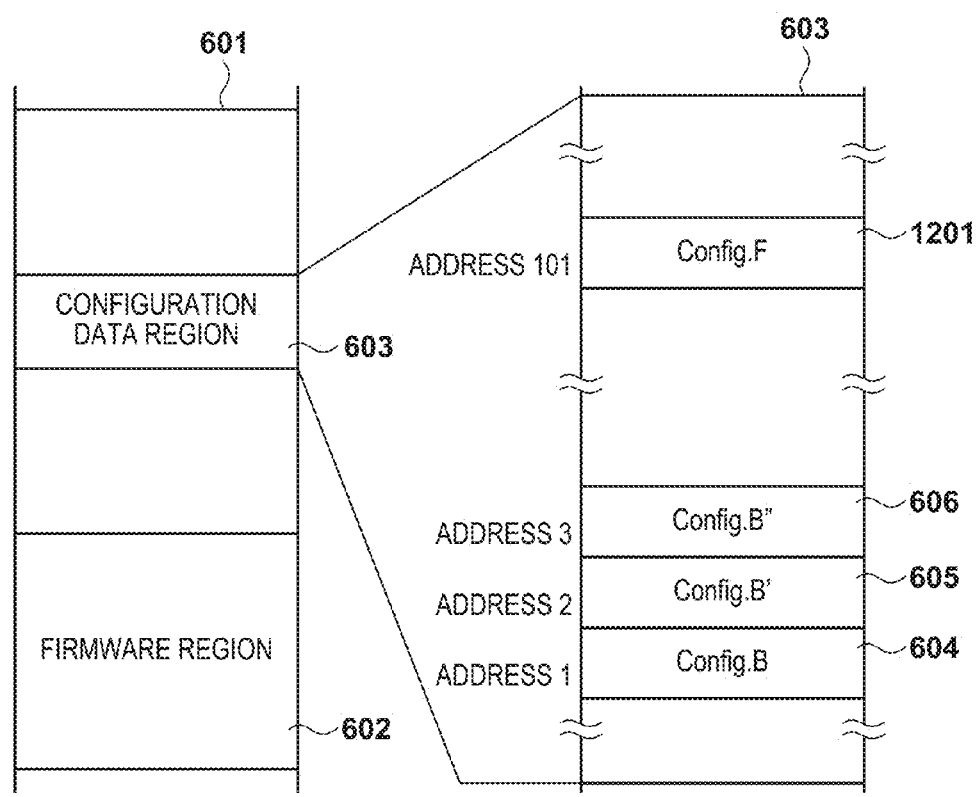
FIG. 12 is a view for explaining a memory map of a ROM of the image processing apparatus according to the second embodiment.

FIG. 12 is a view for explaining a memory map of the ROM 104 of the image processing apparatus 100 according to the second embodiment.

As shown in FIG. 12, configuration data for configuring the logic circuit 802 of FIG. 8A is stored in a memory region 1201 starting from an internal address 101 of the configuration data region 603. Note that the method of determining one desired piece of configuration data from a plurality of pieces of configuration data is the same as the details explained in the above described first embodiment, so explanation thereof is omitted.

Next the processing proceeds to step S1101, and the CPU 101 determines a cell region to be used. Here, for example, the reference table data having the same information as the table shown in FIG. 10C is stored in the ROM 104, so the cell region to be used is determined by referencing the table. Next the processing proceeds to step S722, and the CPU 101 determines a count value corresponding to an operation time, based on a setting parameter included in the job information. The processing proceeds to step S723, the previously described flag is turned on, and this processing terminates.

In step S720, if the CPU 101 determines from the job information that the job does not use a block that includes a wiring line for which an amperage is large, the processing proceeds to step S724, the previously described flag is turned off, this processing finishes, and the processing advances to step S703.

Processing from step S703 is essentially as explained in the first embodiment described previously, but in the second embodiment, differs in a point of using cell region information obtained in step S1101. That is, in step S705 of FIG. 7A, the count value is added for each cell region obtained in step S1101, and an accumulated value for each cell region to be used is obtained. The processing proceeds to step S706, and the CPU 101 determines whether any accumulated value for each cell region to be used has exceeded the threshold. For example, in the example of FIG. 10A to FIG. 10C, if it is determined that the accumulated value for the region 3 has exceeded the threshold, for example configuration data for the block B' that does not include the region 3 is read from the region 605, and the block B of the reconfiguration unit 131 is reconfigured.

As explained above, by the second embodiment, operation time for each cell region is obtained by dividing the internal cell 401 of the FPGA 140 into a plurality of regions, and determining in which region there is arranged a location for a wiring line for which an amperage is large for a block configured in accordance with a job. When the operation time exceeds the threshold, control is performed so as to move the block configured in the region to another region. Thus it is possible to aim to more accurately extend the life span of the FPGA.

Note that in the second embodiment, in order to simplify the explanation, the internal cell 401 of the FPGA was divided into ten regions in FIG. 10A to FIG. 10C, but it is possible to more accurately count operation time by increasing the number of divided regions. However, because management by the CPU will become complicated if divided into too many regions, it is necessary to determine a number of divided regions through a trade-off between ease of management and precision.

In the second embodiment in order to simplify the explanation, explanation was given for only one piece of the configuration data for the block F that configures the logic circuit of the scan image processing unit 280. However, configuration may be taken in which a plurality of pieces of configuration data for the block F are stored in advance, and are capable of being used by switching them in accordance with an operation status thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170898, filed Aug. 25, 2014, which is hereby incorporated by reference herein in its entirety.

What is claimed is:

1. An image processing apparatus including a reconfigurable device, the image processing apparatus comprising:
   a first storage configured to store a plurality of configuration data items for configuring a circuit for realizing a predetermined function in the reconfigurable device, wherein each of the plurality of configuration data items is for arranging and wiring the circuit for realizing the predetermined function at a location in the reconfigurable device different to each other;
   an accumulating circuitry configured to obtain and accumulate operation information based on an operation time for the circuit for realizing the predetermined function, each time a job that uses the circuit for realizing the predetermined function is executed; and
   a reconfiguration circuitry configured to, when an accumulated value accumulated by the accumulating circuitry is greater than a threshold, control so as to configure the circuit for realizing the predetermined function in the reconfigurable device, by using, from the plurality of configuration data items corresponding to the circuit for realizing the predetermined function and stored in the first storage, another configuration data item other than a configuration data item that corresponds to the circuit configured in the reconfigurable device.

2. The image processing apparatus according to claim 1, wherein the circuit for realizing the predetermined function comprises a cell in which an amperage flowing through the cell when the job is being executed is greater than a predetermined value.

3. The image processing apparatus according to claim 1, further comprising a second storage configured to store in a non-volatile manner the accumulated value accumulated by the accumulating circuitry.

4. The image processing apparatus according to claim 1, wherein the reconfiguration circuitry is configured to store which of the plurality of configuration data items is used to configure the circuit for realizing the predetermined function in the reconfigurable device.

5. The image processing apparatus according to claim 4, wherein the reconfiguration circuitry is configured to specify each configuration data item based on an address at which a respective one of the plurality of configuration data items is stored in the first storage.

6. The image processing apparatus according to claim 1, wherein a cell structure of the reconfigurable device is divided into a plurality of regions,
   wherein the image processing apparatus further comprises an identifying circuitry configured to identify which region includes the circuit for realizing the predetermined function,
   wherein the accumulating circuitry is configured to obtain and accumulate operation information based on an operation time for the circuit for realizing the predetermined function, for each region identified by the identifying circuitry as including the circuit for realizing the predetermined function and each time the job that uses the circuit for realizing the predetermined function is executed, and
   wherein the reconfiguration circuitry is configured to, when an accumulated value, which is for one of the regions and is accumulated by the accumulating circuitry, exceeds a threshold, control so as to configure the circuit for realizing the predetermined function in the reconfigurable device, by using, from the plurality of configuration data items corresponding to the circuit for realizing the predetermined function and stored in the first storage, another configuration data item other than a configuration data item that corresponds to the circuit configured in the reconfigurable device.

7. The image processing apparatus according to claim 6, wherein the reconfiguration circuitry is configured to control so as to configure the circuit for realizing the predetermined function in the reconfigurable device, by using, from the plurality of configuration data items corresponding to the circuit for realizing the predetermined function and stored in the first storage, another configuration data item other than a configuration data item that corresponds to the circuit configured in the reconfigurable device, and wherein the another configuration data item is for arranging and wiring to a location that does not include the region for which the accumulated value exceeded the threshold.

8. A method of controlling an image processing apparatus including a reconfigurable device, the image processing apparatus comprising a memory configured to store a plurality of configuration data items for configuring a circuit for realizing a predetermined function in the reconfigurable device, wherein each of the plurality of configuration data items is for arranging and wiring the circuit for realizing the predetermined function at a location in the reconfigurable device different to each other, and the method comprising:
   obtaining and accumulating operation information based on an operation time for the circuit for realizing the predetermined function, each time a job that uses the circuit for realizing the predetermined function is executed; and
   controlling, when an accumulated value accumulated in the accumulating is greater than a threshold, so as to configure the circuit for realizing the predetermined function in the reconfigurable device, by using, from the plurality of configuration data items corresponding to the circuit for realizing the predetermined function and stored in the memory, another configuration data item besides a configuration data item that corresponds to the circuit configured in the reconfigurable device.

9. A non-transitory computer-readable storage medium storing a computer program for causing a computer to execute a method of controlling an image processing apparatus including a reconfigurable device, the image processing apparatus comprising a memory configured to store a plurality of configuration data items for configuring a circuit for realizing a predetermined function in the reconfigurable device, wherein each of the plurality of configuration data items is for arranging and wiring the circuit for realizing the predetermined function at a location in the reconfigurable device different to each other, and the method comprising:
   obtaining and accumulating operation information based on an operation time for the circuit for realizing the predetermined function, each time a job that uses the circuit for realizing the predetermined function is executed; and controlling, when an accumulated value accumulated in the accumulating is greater than a threshold, so as to configure the circuit for realizing the predetermined function in the reconfigurable device, by using, from the plurality of configuration data items corresponding to the circuit for realizing the predetermined function and stored in the memory, another configuration data item besides a configuration data item that corresponds to the circuit configured in the reconfigurable device.

* * * * *